(12) United States Patent
Kurono et al.

(10) Patent No.: US 10,751,923 B2
(45) Date of Patent: Aug. 25, 2020

(54) SPARK PLUG INSULATOR PRODUCTION METHOD, INSULATOR, MOLDING DIE

(71) Applicant: NGK Spark Plug Co., Ltd., Nagoya-shi, Aichi (JP)

(72) Inventors: Hirokazu Kurono, Nagoya (JP); Hironori Uegaki, Nagoya (JP); Toshitaka Honda, Nagoya (JP); Hiroyuki Hazama, Nagoya (JP); Kuniharu Tanaka, Nagoya (JP); Hiroyuki Kawaji, Nagoya (JP)

(73) Assignee: NGK Spark Plug Co., Ltd., Nagoya-shi, Aichi (JP)

( * ) Notice: Subject to any disclaimer, the term of this patent is extended or adjusted under 35 U.S.C. 154(b) by 595 days.

(21) Appl. No.: 15/534,529

(22) PCT Filed: Sep. 23, 2015

(86) PCT No.: PCT/JP2015/004823
§ 371 (c)(1),
(2) Date: Jun. 9, 2017

(87) PCT Pub. No.: WO2016/092723
PCT Pub. Date: Jun. 16, 2016

(65) Prior Publication Data
US 2017/0326765 A1    Nov. 16, 2017

(30) Foreign Application Priority Data
Dec. 9, 2014   (JP) .................................. 2014-249079

(51) Int. Cl.
B29C 45/14    (2006.01)
H01T 21/02    (2006.01)
(Continued)

(52) U.S. Cl.
CPC .......... *B29C 45/14655* (2013.01); *B28B 1/24* (2013.01); *B28B 7/0038* (2013.01);
(Continued)

(58) Field of Classification Search
CPC ............ B28B 1/24; B28B 13/06; H01T 13/06
See application file for complete search history.

(56) References Cited

U.S. PATENT DOCUMENTS

2006/0042610 A1    3/2006  Abe et al.
2012/0068390 A1 *  3/2012  Walker, Jr. .............. H01T 13/38
                                                          264/632
2014/0346945 A1 * 11/2014  Nakamura .............. H01T 13/34
                                                          313/141

FOREIGN PATENT DOCUMENTS

DE   10 2010 042 155 A1      4/2012   ............... B28B 1/24
DE      102012200046 A1 *    7/2013   ............... B28B 7/28
(Continued)

OTHER PUBLICATIONS

Extended European Search Report issued in corresponding European Patent Application No. 15867522.3 dated Jun. 19, 2018.
(Continued)

*Primary Examiner* — Jacob T Minskey
*Assistant Examiner* — Virak Nguon
(74) *Attorney, Agent, or Firm* — Kusner & Jaffe

(57) ABSTRACT

An employed rear mold is comprised of a plurality of mold pieces. The plurality of mold pieces include a first mold piece which forms a first partial internal surface of the internal surface of the rear mold along the entire circumference of the internal surface, and a second mold piece which is located axially forward of the first mold piece and forms a second partial internal surface of the internal surface of the rear mold along the entire circumference of the internal surface. Releasing the molded body includes starting to move the first mold piece rearward in relation to a rear
(Continued)

molded portion, and, subsequently to starting to move the first mold piece, starting to move the second mold piece rearward in relation to the rear molded portion, thereby disassembling the rear mold into the plurality of mold pieces.

5 Claims, 9 Drawing Sheets

(51) Int. Cl.
    *H01T 13/20* (2006.01)
    *B28B 7/34* (2006.01)
    *B28B 13/06* (2006.01)
    *B28B 7/18* (2006.01)
    *B28B 7/00* (2006.01)
    *B28B 1/24* (2006.01)
    *H01T 13/34* (2006.01)
    *H01T 13/39* (2006.01)

(52) U.S. Cl.
    CPC ............... *B28B 7/18* (2013.01); *B28B 7/346* (2013.01); *B28B 13/06* (2013.01); *H01T 13/20* (2013.01); *H01T 21/02* (2013.01); *H01T 13/34* (2013.01); *H01T 13/39* (2013.01)

(56) References Cited

FOREIGN PATENT DOCUMENTS

| EP | 2741382 A1 | 6/2014 | |
| JP | 63-149705 U1 | 10/1988 | ............... B28B 1/24 |
| JP | 08-183062 A | 7/1996 | ............. B29C 45/14 |
| JP | 2006-210142 A | 8/2006 | |
| JP | 2010-228342 A | 10/2010 | ............. B29B 11/14 |
| JP | 2010228342 A * | 10/2010 | ......... B29C 45/2618 |
| JP | 2013-131375 A | 7/2013 | |
| WO | WO-02/20246 A1 | 3/2002 | |
| WO | WO 2013/102514 A1 | 7/2013 | ............... B28B 1/24 |

OTHER PUBLICATIONS

International Search Report from corresponding International Patent Application No. PCT/JP2015/004823, dated Dec. 22, 2015.
Office Action issued in corresponding Japanese Patent Application No. 2015-240127 dated Aug. 16, 2018 (with English-language machine translation).

* cited by examiner

1

SPARK PLUG INSULATOR PRODUCTION METHOD, INSULATOR, MOLDING DIE

FIELD OF THE INVENTION

The present disclosure relates to a technique for manufacturing an insulator for a spark plug.

BACKGROUND OF THE INVENTION

Conventionally, a spark plug is used in an internal combustion engine. The spark plug has, for example, a center electrode extending in an axial direction, an insulator having an axial hole extending in the axial direction with the center electrode disposed in a forward portion of the axial hole, and a metallic shell disposed around the outer circumference of the insulator. A proposed method for manufacturing the insulator employs injection molding, for example.

PRIOR ART DOCUMENTS

Patent Document 1: International Publication No. WO2013/102514
Patent Document 2: German Patent Application Laid-Open No. 10 2010 042 155

PROBLEM TO BE SOLVED BY THE INVENTION

In the case of molding a green molded body of the insulator by use of a mold, the molded body is released from the mold after molding. In some cases, in releasing the molded body, the molded body has deformed as a result of frictional force causing the molded body to be pulled by the mold.

The present disclosure discloses a technique for restraining deformation of a molded body in releasing the molded body from a mold.

SUMMARY OF THE INVENTION

The present disclosure discloses the following application examples, for example.

APPLICATION EXAMPLE 1

A spark plug insulator production method for manufacturing a tubular insulator for a spark plug having a large-diameter portion having the largest outside diameter, a portion smaller in outside diameter than the large-diameter portion, and an axial hole extending in a direction of an axial line, the method comprising the steps of:
disposing a rod member in a space of a rear mold, the rear mold having an internal surface whose shape is identical to an external shape of a rear molded portion located rearward, in the direction of the axial line, of a molded portion corresponding to the large-diameter portion of the insulator, the internal surface defining the space, the rear mold comprising a plurality of mold pieces which form different portions of the internal surface, the rod member having an external surface identical in shape to a portion of the axial hole of the insulator corresponding to the rear molded portion;
injecting a material into a space formed between the internal surface of the rear mold and the external surface of the rod member, thereby molding the rear molded portion; and

2 releasing the rear molded portion from the rear mold by disassembling the rear mold into the plurality of mold pieces, wherein
the plurality of mold pieces include a first mold piece which forms a first partial internal surface of the internal surface of the rear mold along the entire circumference of the internal surface, and a second mold piece which is located forward, in the direction of the axial line, of the first mold piece and forms a second partial internal surface of the internal surface of the rear mold along the entire circumference of the internal surface; and
the step of releasing the rear molded portion from the rear mold includes starting to move the first mold piece rearward in the direction of the axial line in relation to the rear molded portion, and, subsequently to starting to move the first mold piece, starting to move the second mold piece rearward in relation to the rear molded portion, thereby disassembling the rear mold into the plurality of mold pieces.

According to this configuration, since the first mold piece and the second mold piece start to move in relation to the rear molded portion at different timings, deformation of the rear molded portion can be restrained in releasing the rear molded portion front the rear mold.

APPLICATION EXAMPLE 2

The spark plug insulator production method according to application example 1, wherein each of the first partial internal surface and the second partial internal surface of the rear mold includes a portion whose inclination from the direction of the axial line is 5/1.000 or less.

According to this configuration, deformation of the rear molded portion having a small surface inclination can be restrained in releasing the rear molded portion from the rear mold.

APPLICATION EXAMPLE 3

An insulator for a spark plug having a tubular form and comprising a large-diameter portion having the largest outside diameter, a portion smaller in outside diameter than the large-diameter portion, and an axial hole extending in a direction of an axial line;
the insulator being manufactured by the method according to application example 1 or 2;
a minimum value of thickness of a portion of a rear portion of the insulator remaining after removing a rear end portion from the rear portion being 2.6 mm or less, the rear portion being located rearward, in the direction of the axial line, of the large-diameter portion; and
the rear portion of the insulator having a length of 30 mm or more along the direction of the axial line.

According to this configuration, an insulator including the rear portion having a particular structure can be manufactured appropriately.

APPLICATION EXAMPLE 4

A mold for molding a tubular insulator for a spark plug having a large-diameter portion having the largest outside diameter, a portion smaller in outside diameter than the large-diameter portion, and an axial hole extending in a direction of an axial line, the mold comprising:
a rear mold having an internal surface whose shape is identical to an external shape of a rear molded portion located rearward, in the direction of the axial line, of a molded portion corresponding to the large-diameter portion of the insulator, and having a space defined by the internal surface; and a rod member having an external surface identical in shape to a portion of the axial hole of the insulator corresponding to the rear molded portion, and being disposed in the space of the rear mold, wherein the rear mold comprises a plurality of mold pieces which form different portions of the internal surface of the rear mold.

According to this configuration, since the rear molded portion can be released from the rear mold by disassembling the rear mold into the plurality of mold pieces, deformation of the rear molded portion can be restrained in releasing the rear molded portion from the rear mold.

APPLICATION EXAMPLE 5

The mold according to application example 4, wherein the plurality of mold pieces form different portions of the internal surface of the rear mold which differ in circumferential range.

According to this configuration, since the rear mold can be readily disassembled into the plurality of mold pieces, deformation of the rear molded portion can be restrained in releasing the rear molded portion from the rear mold.

APPLICATION EXAMPLE 6

The mold according to application example 4 or 5, wherein the plurality of mold pieces form different portions of the internal surface of the rear mold which differ in axial range along the direction of the axial line.

According to this configuration, since the rear mold can be readily disassembled into the plurality of mold pieces, deformation of the rear molded portion can be restrained in releasing the rear molded portion from the rear mold.

The present invention can be embodied in various forms; for example, a mold for molding a green molded body of an insulator for a spark plug, a method for manufacturing an insulator for a spark plug, an insulator manufactured by the method, a spark plug having the insulator, a method for manufacturing a spark plug, and a spark plug manufactured by the method.

DETAILED DESCRIPTION OF THE INVENTION

A. First Embodiment

Figure 1:
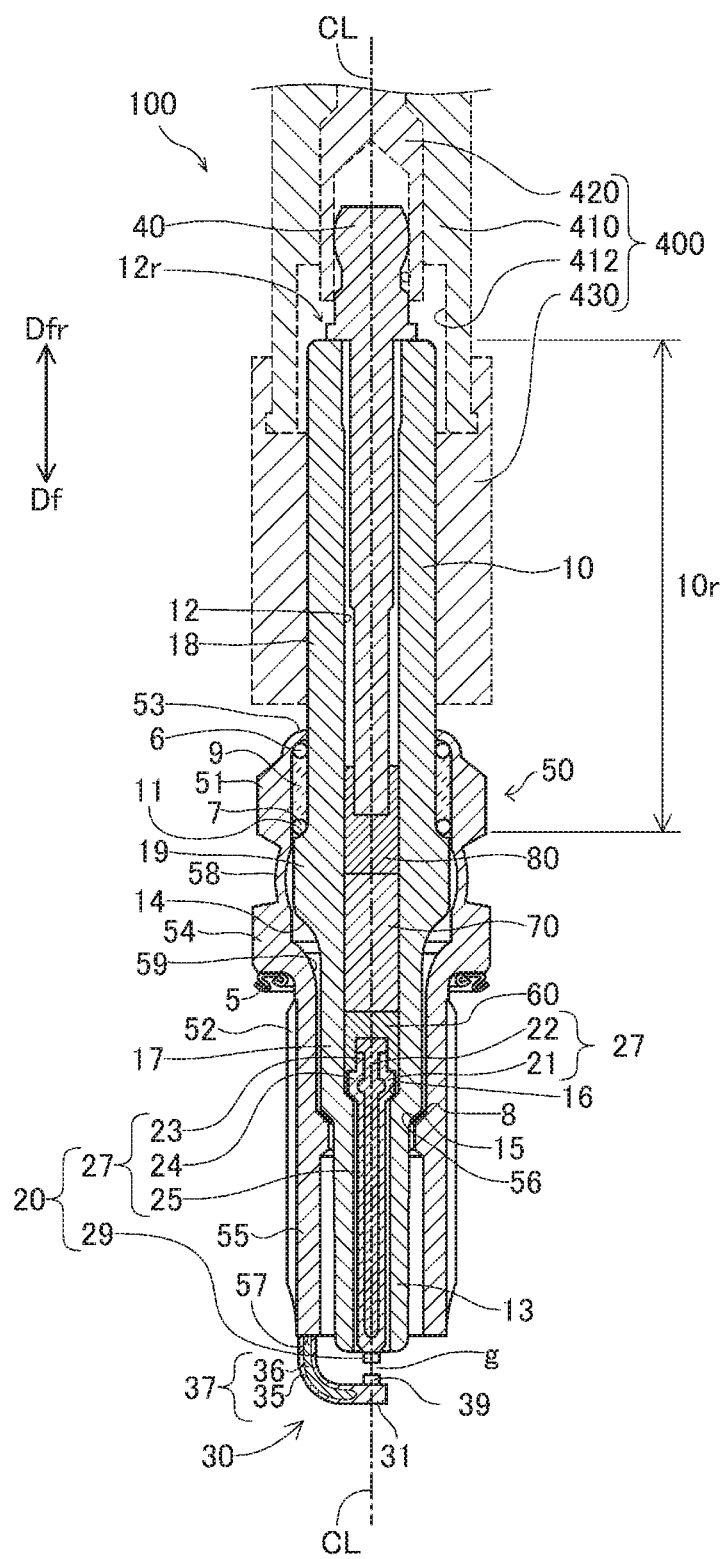
FIG. 1 is a sectional view of an embodiment of a spark plug.

A1. Configuration of Spark Plug:

FIG. 1 is a sectional view of an embodiment of a spark plug. FIG. 1 shows a center axis CL (also called an "axial line CL") of a spark plug 100. The illustrated section is a section which contains the center axis CL. Hereinafter, a direction parallel to the center axis CL is called the "direction of the axial line CL" or may be called merely the "axial direction" or the "front-back direction." A radial direction of a circle centered on the center axis CL is called merely a "radial direction," and a circumferential direction of the circle centered on the center axis CL is called merely a "circumferential direction." With regard to a direction parallel to the center axis CL, the downward direction in FIG. 1 is called the forward-end direction Df or the forward direction Df, and the upward direction is called the rear-end direction Dfr or the rearward direction Dfr. The forward-end direction Df is directed from a metal terminal member 40 toward electrodes 20 and 30, which will be described later. A side in the forward-end direction Df in FIG. 1 is called the forward side of the spark plug 100, and a side in the rear-end direction Dfr is called the rear side of the spark plug 100.

The spark plug 100 includes an insulator 10 (also called a "ceramic insulator"), a center electrode 20, a ground electrode 30, a metal terminal member 40, a metallic shell 50, an electrically conductive first seal member 60, a resistor 70, an electrically conductive second seal member 80, a forward packing 8, talc 9, a first rear packing 6, and a second rear packing 7.

The insulator 10 is a substantially cylindrical member having a through hole 12 (hereinafter also called an "axial hole 12") extending therethrough along the center axis C.L. The insulator 10 is formed by firing alumina (other electrically insulative materials can also be used). The insulator 10 has a leg portion 13, a first outside-diameter-reducing portion 15, a forward trunk portion 17, a third outside-diameter-reducing portion 14, a collar portion 19, a second outside-diameter-reducing portion 11, and a rear trunk portion 18 disposed sequentially in the rearward direction Dfr from the forward side. The collar portion 19 (also called the large-diameter portion 19) is a portion having the largest outside diameter in the insulator 10. A portion of the insulator 10 other than the large-diameter portion 19 is smaller in outside diameter than the large-diameter portion 19. The outside diameter of the first outside-diameter-reducing portion 15 gradually reduces forward from the rear side. The insulator 10 has a first inside-diameter-reducing portion 16 formed in the vicinity of the first outside-diameter-reducing portion 15 (in the forward trunk portion 17 in the example of FIG. 1), and the inside diameter of the first inside-diameter-reducing portion 16 gradually reduces forward from the rear side. The outside diameter of the second outside-diameter-reducing portion 11 gradually reduces rearward from the forward side. The outside diameter of the third outside-diameter-reducing portion 14 gradually reduces forward from the rear side. The drawing indicates the axial range in the direction of the axial line CL of a rear portion 10r of the insulator 10. The rear portion 10r is a particular portion of the insulator 10 located rearward Dfr of the large-diameter portion 19.

As shown in FIG. 1, the center electrode 20 is inserted into a forward end portion of the axial hole 12 of the insulator 10. The center electrode 20 has a rodlike shaft member 27 extending along the center axis CL and a first tip 29 joined to the forward end of the shaft member 27. The shaft member 27 has a leg portion 25, a collar portion 24, and a head portion 23 disposed sequentially in the rearward direction Dfr from the forward side. The first tip 29 is joined (for example, by laser welding) to the forward end of the leg portion 25 (i.e., the forward end of the shaft member 27). At least a portion of the first tip 29 protrudes from the forward end of the axial hole 12 of the insulator 10. The collar portion 24 is supported by the first inside-diameter-reducing portion 16 of the insulator 10 at the surface on the forward direction Df side. Also, the shaft member 27 has an outer layer 21 and a core 22. The outer layer 21 is formed of a material superior in oxidation resistance to the core 22; i.e., a material which is less eroded upon exposure to combustion gas in a combustion chamber of an internal combustion engine (e.g., pure nickel or an alloy which contains nickel and chromium). The core 22 is formed of a material (e.g., pure copper or a copper alloy) higher in thermal conductivity than the outer layer 21. A rear end portion of the core 22 protrudes from the outer layer 21 and forms a rear end portion of the center electrode 20. The other portion of the core 22 is covered with the outer layer 21. However, the entire core 22 may be covered with outer layer 21. The first tip 29 is formed of a material superior in durability against discharge to the shaft member 27 (e.g., a noble metal, such as iridium (Ir) or platinum (Pt), tungsten (W), or an alloy which contains at least one selected from these metals).

A portion of the metal terminal member 40 is inserted into a rear portion of the axial hole 12 of the insulator 10. The metal terminal member 40 is formed of an electrically conductive material (e.g., low-carbon steel or a like metal).

A plug cap 400 is attached to the rearward direction Dfr side of the spark plug 100. The plug cap 400 has, for example, a cap body 410 made of resin and having a cavity 412, a terminal connection member 420 made of metal and fixed within the cavity 412, and a ring-like cover 430 made of rubber and fixed to the cap body 410 in such a manner as to surround the cavity 412. An unillustrated plug cord is connected to the terminal connection member 420. The terminal connection member 420 comes into contact with the metal terminal member 40 to thereby electrically connect the plug cord and the metal terminal member 40. The cover 430 comes into close contact with an outer circumferential surface of the insulator 10 (particularly, the rear trunk portion 18). As a result, detachment of the plug cap 400 from the spark plug 100 is restrained. Also, entry of water into the cavity 412 from outside is restrained.

The resistor 70 having a substantially circular columnar shape is disposed within the axial hole 12 of the insulator 10 between the metal terminal member 40 and the center electrode 20 for restraining electrical noise. The resistor 70 is formed of, for example, a material which contains an electrically conductive material (e.g., carbon particles), ceramic particles (e.g., $ZrO_2$ particles), and glass particles (e.g., $SiO_2$—$B_2O_3$—$Li_2O$—$BaO$ glass particles). The electrically conductive first seal member 60 is disposed between the resistor 70 and the center electrode 20, and the electrically conductive second seal member 80 is disposed between the resistor 70 and the metal terminal member 40. The seal members 60 and 80 are formed of a material which contains glass particles similar to those contained in the material of the resistor 70 and metal particles (e.g., Cu particles). The center electrode 20 and the metal terminal member 40 are electrically connected through the resistor 70 and the seal members 60 and 80.

The metallic shell 50 is a substantially cylindrical member having a through hole 59 extending therethrough along the center axis CL. The metallic shell 50 is formed of low-carbon steel (other electrically conductive materials (e.g., a metal material) can also be used). The insulator 10 is inserted into the through hole 59 of the metallic shell 50. The metallic shell 50 is fixed to the outer circumference of the insulator 10. The forward end of the insulator 10 (in the present embodiment, a forward end portion of the leg portion 13) protrudes from the forward end of the through hole 59 of the metallic shell 50. The rear end of the insulator 10 (in the present embodiment, a rear end portion of the rear trunk portion 18) protrudes from the rear end of the through hole 59 of the metallic shell 50.

The metallic shell 50 has a trunk portion 55, a seat portion 54, a deformed portion 58, a tool engagement portion 51, and a crimp portion 53 disposed sequentially rearward from the forward side. The seat portion 54 is a collar-like portion. The trunk portion 55 is a substantially cylindrical portion extending from the seat portion 54 in the forward direction Df along the center axis CL. The trunk portion 55 has a thread 52 formed on the outer circumferential surface thereof and adapted to threadingly engage the trunk portion 55 with a mounting hole of an internal combustion engine. An annular gasket 5 formed by bending a metal plate is fitted between the seat portion 54 and the thread 52.

The metallic shell 50 has an inside-diameter-reducing portion 56 disposed forward Df of the deformed portion 58. The inside diameter of the inside-diameter-reducing portion 56 gradually reduces rearward. The forward packing 8 is held between the inside-diameter-reducing portion 56 of the metallic shell 50 and the first outside-diameter-reducing portion 15 of the insulator 10. The forward packing 8 is an O-shaped ring made of iron (other materials (e.g., a metal material such as copper) can also be used).

A tool for tightening the spark plug 100 (e.g., a spark plug wrench) is engaged with the tool engagement portion 51. In the present embodiment, the tool engagement portion 51 has an external shape resembling a hexagonal column extending along the center axis CL. The crimp portion 53 is disposed rearward of the second outside-diameter-reducing portion 11 of the insulator 10 and forms a rear end (i.e., an end on the rearward direction Dfr side) of the metallic shell 50. The crimp portion 53 is bent radially inward. On the forward direction Df side of the crimp portion 53, the first rear packing 6, the talc 9, and the second rear packing 7 are disposed in this order in the forward direction Df between an internal circumferential surface of the metallic shell 50 and an outer circumferential surface of the insulator 10. In the present embodiment, these rear packings 6 and 7 are C-shaped rings made of iron (other materials can also be used).

In manufacture of the spark plug 100, the crimp portion 53 is crimped in such a manner as to be bent inward. Also, the crimp portion 53 is pressed in the forward direction Df. As a result, the deformed portion 58 is deformed, whereby the insulator 10 is pressed forward in the metallic shell 50 through the packings 6 and 7 and the talc 9. The forward packing 8 is pressed between the first outside-diameter-reducing portion 15 and the inside-diameter-reducing portion 56 to thereby provide a seal between the metallic shell 50 and the insulator 10. By the above procedure, the metallic shell 50 is fixed to the insulator 10.

In the present embodiment, the ground electrode 30 has a rodlike shaft member 37 and a second tip 39 joined (by resistance welding, for example) to a distal end portion 31 of the shaft member 37. The proximal end of the shaft member 37 is joined to a forward end surface 57 (i.e., a surface 57 on the forward direction Df side) of the metallic shell 50. The shaft member 37 extends in the forward direction Df from the forward end surface 57 of the metallic shell 50; then, is bent toward the center axis CL; and reaches the distal end portion 31. The distal end portion 31 is disposed on the forward direction Df side of the center electrode 20. The second tip 39 is joined (by laser welding, for example) to a surface of the distal end portion 31 which faces the center electrode 20. The second tip 39 is formed of a material superior in durability (against discharge) to the shaft member 37 (e.g., a noble metal, such as iridium (Ir) or platinum (Pt), tungsten (W), or an alloy which contains at least one selected from these metals). The first tip 29 of the center electrode 20 and the second tip 39 of the ground electrode 30 form a gap g therebetween for spark discharge. The ground electrode 30 faces a forward end portion of the center electrode 20 with the gap g intervening therebetween.

The shaft member 37 of the ground electrode 30 has an outer layer 35 which forms at least a portion of the surface of the shaft member 37, and a core 36 embedded in the outer layer 35. The outer layer 35 is formed of a material having excellent oxidation resistance (e.g., an alloy which contains nickel and chromium). The core 36 is formed of a material (e.g., pure copper) higher in thermal conductivity than the outer layer 35.

Figure 2:
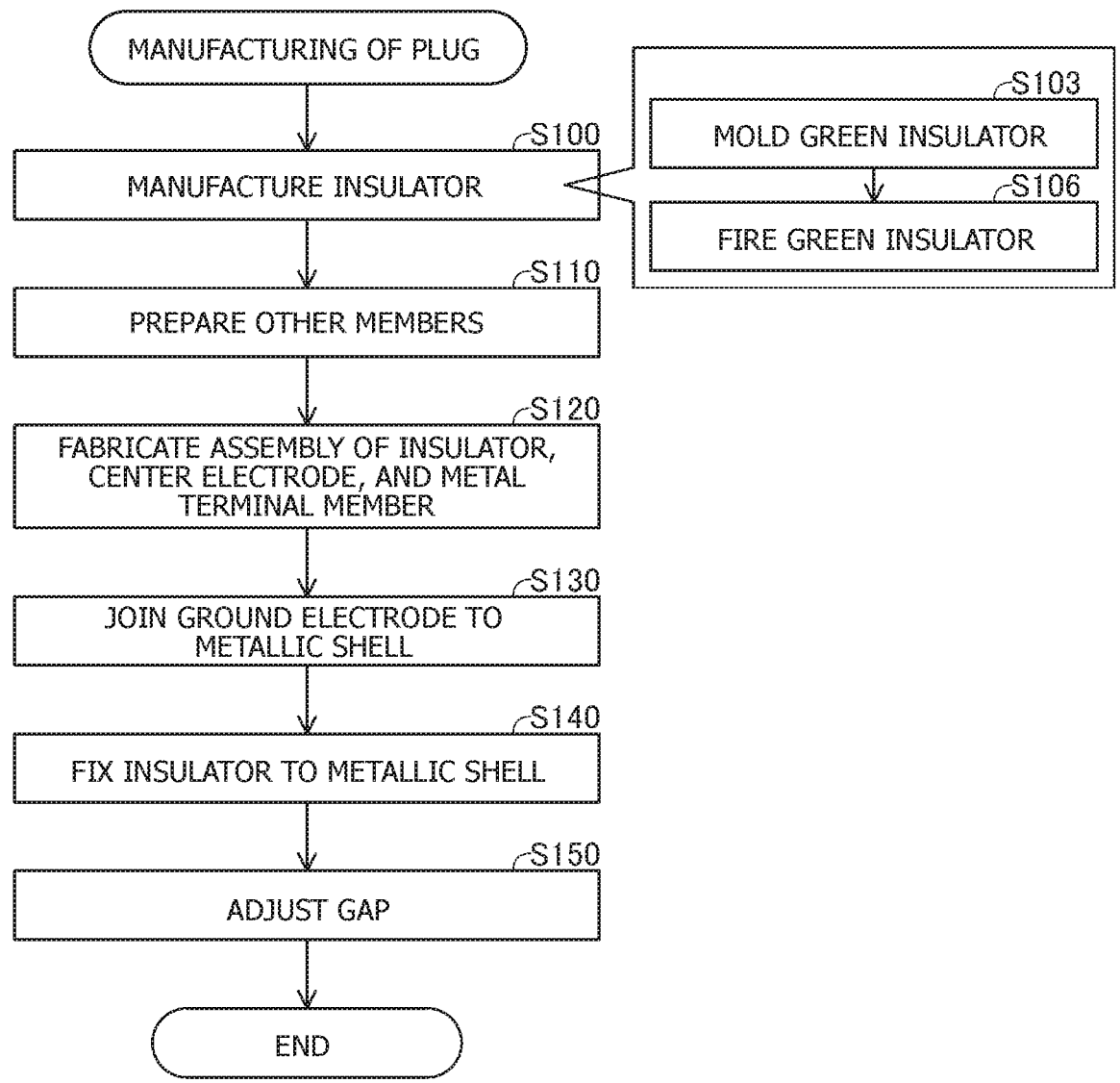
FIG. 2 is a flowchart showing an example method for manufacturing a spark plug 100.

A2. Manufacturing Method:

FIG. 2 is a flowchart showing an example method for manufacturing the spark plug 100. In step S100, the insulator 10 is manufactured. In FIG. 2, the details of step S100 are shown at the right of step S100. In the present embodiment, in step S103, a green insulator is molded, and in step S106, the green insulator is fired. Before firing, the molded insulator may be machined to a predetermined shape (e.g., end portions may be polished). A method for molding in step S103 will be described later in detail.

In step S110, other members of the spark plug 100 are prepared. Specifically, the center electrode 20, the metal terminal member 40, the metallic shell 50, and the rodlike ground electrode 30 are manufactured by publicly known methods. Powder materials for the seal members 60 and 80 and a powder material for the resistor 70 are prepared. In steps S100 and S110, the members are prepared independently of one another.

In step S120, there is manufactured an assembly which has the insulator 10, the center electrode 20, the first seal member 60, the resistor 70, the second seal member 80, and the metal terminal member 40. A publicly known method can be employed for manufacturing the assembly. For example, the center electrode 20, a material for the first seal member 60, a material for the resistor 70, and a material for the second seal member 80 are inserted in this order into the through hole 12 of the insulator 10 from an opening 12r on the rear direction Dfr side. Then, in a state in which the insulator 10 is heated, the metal terminal member 40 is inserted into the through hole 12 from the opening 12r, whereby an assembly is manufactured.

In step S130, the rodlike ground electrode 30 is joined to the metallic shell 50. In step S140, the assembly is fixed to the metallic shell 50. Specifically, the forward packing 8, the assembly manufactured in step S120, the second rear packing 7, the talc 9, and the first rear packing 6 are disposed in the through hole 59 of the metallic shell 50. The forward packing 8 intervenes between the first outside-diameter-reducing portion 15 of the insulator 10 and the inside-diameter-reducing portion 56 of the metallic shell 50. The crimp portion 53 of the metallic shell 50 is crimped in such a manner as to be bent inward, whereby the metallic shell 50 and the insulator 10 are assembled together.

In step S150, the rodlike ground electrode 30 is bent to thereby form the gap g. The ground electrode 30 is bent such that the distance across the gap g becomes a predetermined distance. Now, the spark plug 100 has been completed.

Figure 3:
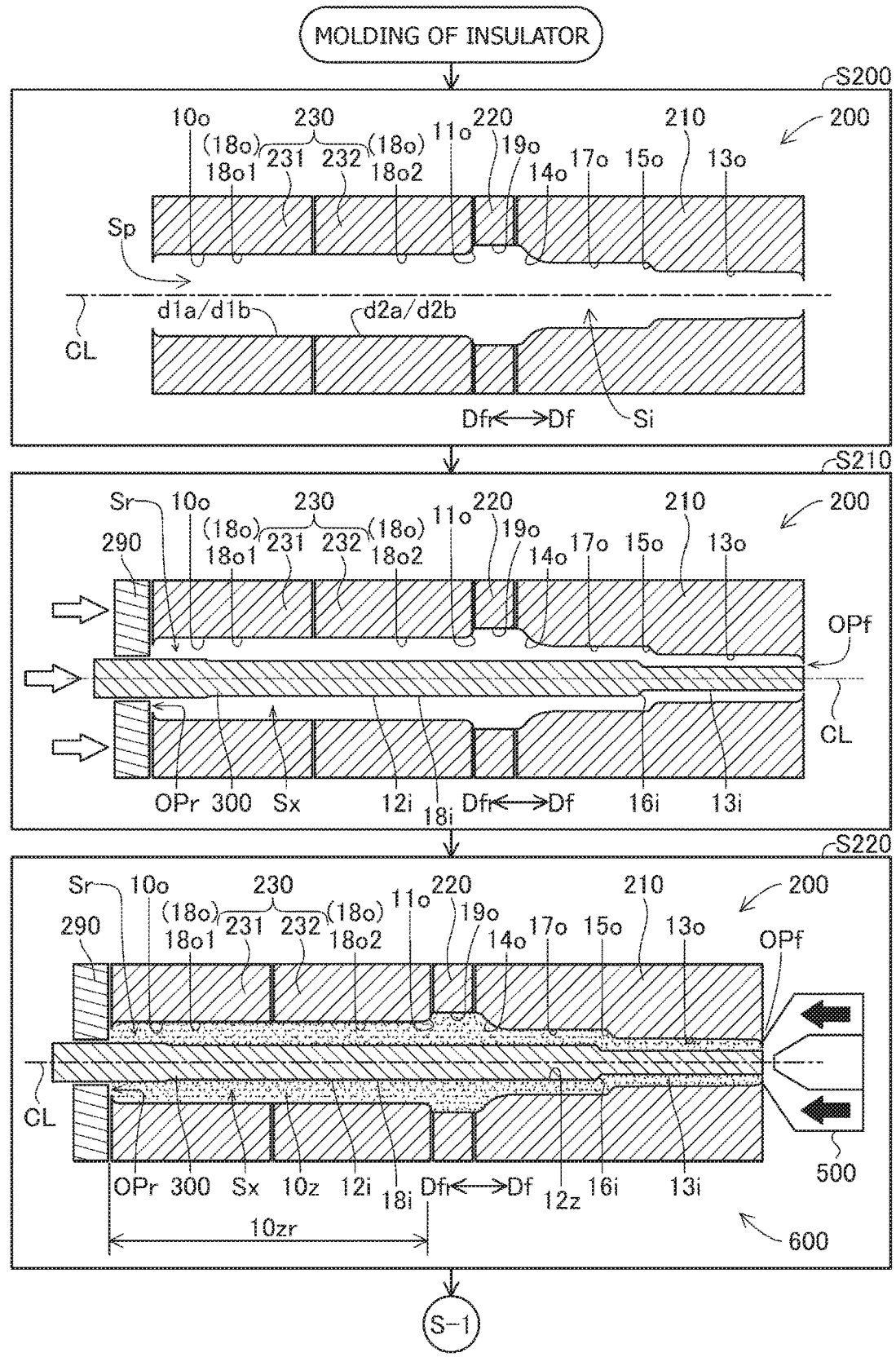
FIG. 3 is a flowchart showing an example procedure for molding a green insulator.
Figure 4:
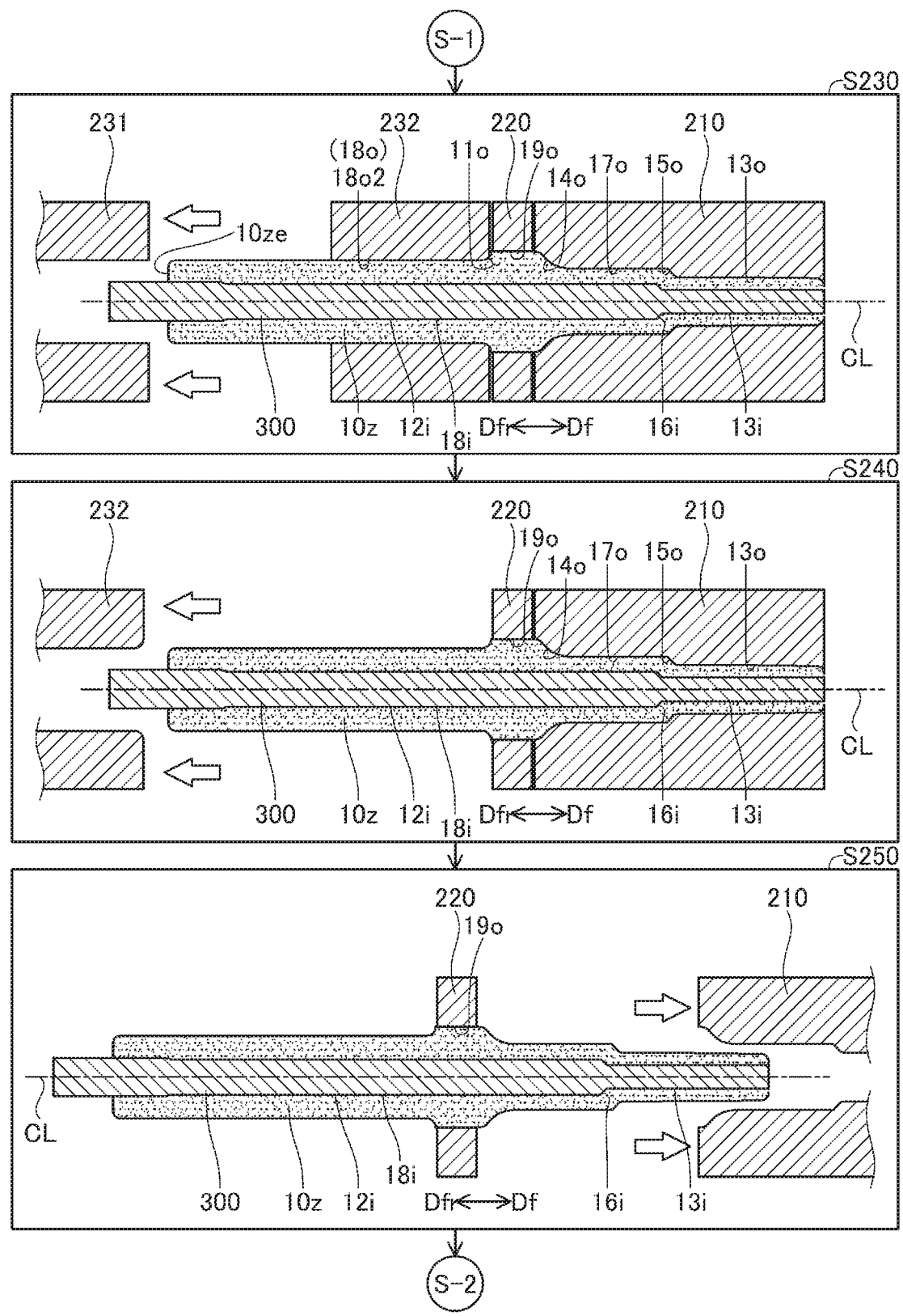
FIG. 4 is a flowchart showing the example procedure for molding the green insulator.
Figure 5:
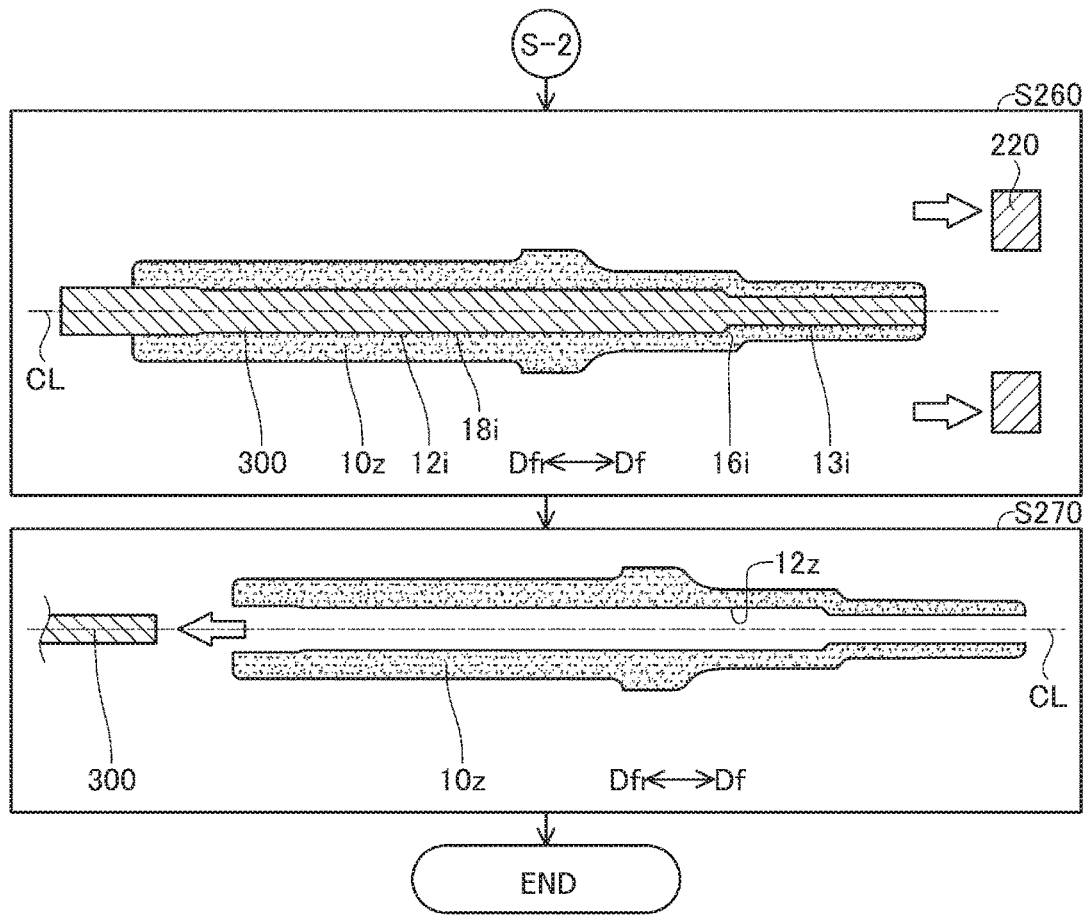
FIG. 5 is a flowchart showing the example procedure for molding the green insulator.

FIGS. 3, 4, and 5 are flowcharts showing an example procedure of a step (S103 in FIG. 2) for molding a green insulator. FIG. 4 is continued from FIG. 3, and FIG. 5 is continued from FIG. 4. In the drawings, frames indicative of steps confine schematic sections of molds used in the steps. In the drawings, the center axis CL and the directions Df and Dfr are illustrated. The disposition of the center axis CL and the directions Df and Dfr in relation to the mold is obtained by applying the disposition of the center axis CL and the directions Df and Dfr in relation to the completed insulator 10 to a molded insulator contained in the mold. The schematic sections are taken by cutting with a plane which contains the center axis CL. Hereinafter, a molded green insulator is also called a "molded body." A direction of the mold parallel to the center axis CL is also called the "front-back direction of the mold."

Figure 6:
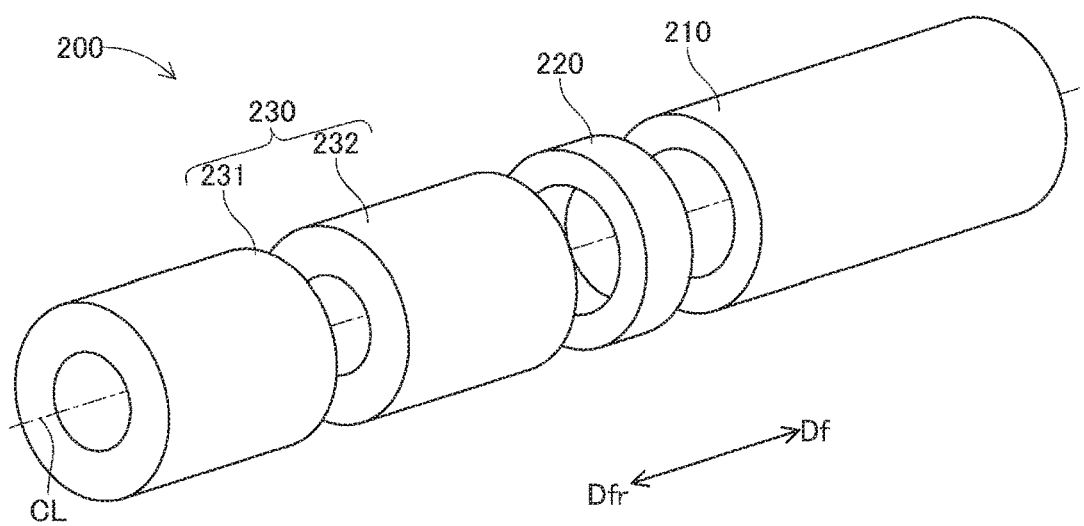
FIG. 6 is an exploded perspective view of an external mold 200.

In step S200, a plurality of mold pieces 210, 220, 231, and 232 are assembled to form an external mold 200. The external mold 200 molds an outer circumferential surface of a molded body of the insulator 10. FIG. 6 is an exploded perspective view of the external mold 200. In the present embodiment, the external mold 200 has the forward mold 210, the intermediate mold 220 disposed rearward Dfr of the forward mold 210, and a rear mold 230 disposed rearward Dfr of the intermediate mold 220. Hereinafter, the forward mold 210 is also called the "forward mold piece 210"; the intermediate mold 220 is also called the "intermediate mold piece 220"; and the rear mold 230 is also called the "rear mold piece 230." The rear mold piece 230 is composed of a first mold piece 231 and a second mold piece 232 disposed forward Df of the first mold piece 231. These four mold pieces 231, 232, 220, and 210 are disposed in this order in the forward direction Df. As shown in FIG. 6, the four mold pieces 231, 232, 220, and 210 form inner circumferential surfaces (also called internal surfaces) around the axial line CL. These mold pieces 231, 232, 220, and 210 are formed of metal (other materials can also be used).

An internal surface 10o of the external mold 200 (FIG. 3) is a molding surface (also called a "molding surface 10o") for molding the outer circumferential surface of a molded body of the insulator 10. The molding surface 10o is formed by connecting the internal surfaces of the four mold pieces 231, 232, 220, and 210. In FIG. 3, the reference numerals of portions of the molding surface 10o of the external mold 200 are those of corresponding portions of the insulator 10 with the suffix "o." An internal surface 19o of the intermediate mold piece 220 molds the outer circumferential surface of the large-diameter portion 19. The internal surface of the forward mold piece 210 molds the outer circumferential surface of a portion located forward Df of the large-diameter portion 19. The internal surface of the rear mold piece 230 molds the outer circumferential surface of a portion located rearward Dfr of the large-diameter portion 19.

The forward mold piece 210 has internal surfaces 14o, 17o, 15o, and 13o. These internal surfaces 14o, 17o, 15o, and 13o are continuously disposed in this order in the forward direction Df. The internal surface 14o is connected to the internal surface 19o of the intermediate mold piece 220 on the forward direction Df side and molds the outer circumferential surface of the third outside-diameter-reducing portion 14. The inside diameter of the internal surface 14*o* gradually reduces in the forward direction Df. The internal surface 17*o* molds the outer circumferential surface of the forward trunk portion 17; the internal surface 15*o* molds the outer circumferential surface of the first outside-diameter-reducing portion 15; and the internal surface 13*o* molds the outer circumferential surface of the leg portion 13. The inside diameter of the internal surface 15*o* gradually reduces in the forward direction Df.

The rear mold piece 230 has internal surfaces 18*o* and 11*o*. The internal surfaces 18*o* and 11*o* of the rear mold piece 230 are divided into the internal surface of the first mold piece 231 and the internal surface of the second mold piece 232. The first mold piece 231 has an internal surface 18*o*1, which is a portion of the internal surface 18*o* located on the rearward direction Dfr side. The second mold piece 232 has an internal surface 18*o*2, which is a portion of the internal surface 18*o* located on the forward direction Df side, and the internal surface 11*o* connected to the internal surface 18*o*2 on the forward direction Df side. The internal surface 18*o*1 of the first mold piece 231 molds the outer circumferential surface of a portion of the rear trunk portion 18 located on the rearward direction Dfr side. The internal surface 18*o*2 of the second mold piece 232 is connected to the internal surface 18*o*1 on the forward direction Df side and molds the outer circumferential surface of a portion of the rear trunk portion 18 located on the forward direction Df side. The internal surface 11*o* of the second mold piece 232 molds the outer circumferential surface of the second outside-diameter-reducing portion 11. The inside diameter of the internal surface 11*o* gradually increases in the forward direction Df. The internal surface 19*o* is connected to the internal surface 11*o* on the forward direction Df side.

The shapes of the above-described internal surfaces of the external mold 200 are identical to external shapes of corresponding portions of a molded body of the insulator 10. In step S200, a plurality of the mold pieces 231, 232, 220, 210 are assembled (connected), whereby the internal surfaces of the mold pieces 231, 232, 220, and 210 are connected to form the molding surface 10*o*. The shape of the molding surface 10*o* is identical to the external shape of a molded body of the insulator 10. A space Si surrounded by the molding surface 10*o* corresponds to a molded body of the insulator 10. FIGS. 3 and 4 exaggeratingly show gaps between the assembled mold pieces (e.g., the mold pieces 231, 232, 220, and 210) for the purpose of explanation; however, in actuality, the gaps are sufficiently small so as not to affect manufacturing of the insulator 10.

In the next step S210, a rod member 300 is disposed in the space Si. The rod member 300 extends along the axial line CL. The rod member 300 is formed of, for example, metal (other materials can also be used). An external surface 12*i* of the rod member 300 is a molding surface (also called a "molding surface 12*i*") for molding the circumferential wall surface of the through hole 12 of the insulator 10 (FIG. 1). The shape of the molding surface 12*i* is identical to the shape of the wall surface of an axial hole of the molded body (corresponding to the axial hole 12 of the insulator 10). Thus, the rod member 300 can be said to be a portion of the mold.

The external surface 12*i* of the rod member 300 is divided into three portions 18*i*, 16*i*, and 13*i*. The first external surface 18*i* molds the inner circumferential surface of a portion of the insulator 10 located rearward Dfr of the first inside-diameter-reducing portion 16. The second external surface 16*i* is connected to the first external surface 18*i* on the forward direction Df side and molds the inner circumferential surface of the first inside-diameter-reducing portion 16 of the insulator 10. The outside diameter of the second external surface 16*i* gradually reduces in the forward direction Df. The third external surface 13*i* is connected to the second external surface 16*i* on the forward direction Df side and molds the inner circumferential surface of a portion of the insulator 10 located forward Df of the first inside-diameter-reducing portion 16.

In step S210, the rod member 300 is inserted into the space Si from the rearward direction Dfr side. The external mold 200 and the rod member 300 define a space Sx located between the internal surface 10*o* of the external mold 200 and the external surface 12*i* of the rod member 300, a ring-like first opening OPf communicating with the space Sx and located on the forward-end direction Df side, and a ring-like second opening OPr communicating with the space Sx and located on the rear-end direction Dfr side. In step S210, a rear end mold 290 for closing the second opening OPr is further disposed on the rearward direction Dfr side of the external mold 200. The shape of the space Sx is identical to the shape of a molded body of the insulator 10.

In the next step S220, a nozzle 500 of an injection machine is connected to the first opening OPf. The nozzle 500 injects a material into the space Sx through the first opening OPf. In this manner, the first opening OPf is used as a gate. As a result of the injection, a molded body 10*z* is molded. The material contains, for example, alumina and sintering aids. A mold 600 for molding the molded body 10*z* (i.e., the insulator 10) has the external mold 200, the rod member 300, and the rear end mold 290.

The drawing shows the range of a rear molded portion 10*zr* of the molded body 10*z* in the direction of the axial line CL, and an axial hole 12*z*. The rear molded portion 10*zr* corresponds to the rear portion 10*r* of the insulator 10 (FIG. 1). The axial hole 12*z* is a through hole corresponding to the axial hole 12 of the insulator 10. The internal surfaces 18*o* and 11*o* of the rear mold piece 230 include an internal surface whose shape is identical to the external shape of the rear molded portion 10*zr*. The external surface 12*i* of that portion of the rod member 300 disposed in the space Si which is located in a space Sp (S200) surrounded by the rear mold 230 includes a portion whose shape is identical to the shape of a portion of the axial hole 12 of the insulator 10 formed in the rear molded portion 10*zr*. That is, a space Sr between the internal surfaces 18*o* and 11*o* of the rear mold piece 230 and the external surface 12*i* of the rod member 300 corresponds to the rear molded portion 10*zr*.

In the next step S230 (FIG. 4), the rear end mold 290 and the first mold piece 231 are removed from the molded body 10*z*. The rear end mold 290 is moved in the rearward direction Dfr in relation to the molded body 10*z* to thereby be removed from the molded body 10*z*. The first mold piece 231 is moved in the rearward direction Dfr in relation to the molded body 10*z* to thereby be removed from the molded body 10*z*. In the next step S240, the second mold piece 232 is moved in the rearward direction Dfr in relation to the molded body 10*z* to thereby be removed from the molded body 10*z*. Subsequently to starting to move the first mold piece 231 in relation to the molded body 10*z*, the second mold piece 232 starts to be moved in relation to the molded body 10*z*. In the present embodiment, after the entire first mold piece 231 is moved in the rearward direction Dfr beyond an end 10*ze* of the molded body 10*z* on the rearward direction Dfr side, the second mold piece 232 is moved in relation to the molded body 10*z*.

The first mold piece 231 and the second mold piece 232 do not have a portion whose inside diameter increases in the rearward direction Dfr. Therefore, by moving the mold pieces 231 and 232 in the rearward direction Dfr, the mold pieces 231 and 232 can be removed from the molded body 10z while restraining deformation of the molded body 10z.

In the next step S250, the forward mold piece 210 is moved in the forward direction Df in relation to the molded body 10z to thereby remove the forward mold piece 210 from the molded body 10z. The forward mold piece 210 does not have a portion whose inside diameter increases in the forward direction Df. Therefore, by moving the forward mold piece 210 in the forward direction Df, the forward mold piece 210 can be removed from the molded body 10z while restraining deformation of the molded body 10z.

In the next step S260 (FIG. 5), the intermediate mold piece 220 is moved in the forward direction Df in relation to the molded body 10z to thereby remove the intermediate mold piece 220 from the molded body 10z. The intermediate mold piece 220 may be moved in the rearward direction Dfr in relation to the molded body 10z. In the next step S270, the rod member 300 is moved in the rearward direction Dfr in relation to the molded body 10z to thereby remove the rod member 300 from the molded body 10z. In the present embodiment, the rod member 300 does not have a portion whose outside diameter reduces in the rearward direction Dfr. Therefore, by moving the rod member 300 in the rearward direction Dfr, the rod member 300 can be removed from the molded body 10z while restraining deformation of the molded body 10z. Now, all of the mold pieces have been removed from the molded body 10z.

As described above, after the molded body 10z is molded through injection of a material, the rear mold piece 230 is disassembled into a plurality of the mold pieces 231 and 232, whereby the molded body 10z is released from the rear mold piece 230 (S230 and S240 in FIG. 4). Meanwhile, the first mold piece 231 forms a portion of the internal surface of the rear mold piece 230 along the entire circumference of the internal surface, and the second mold piece 232 forms a portion of the internal surface of the rear mold piece 230 along the entire circumference of the internal surface located on the forward direction Df side of the first mold piece 231. Therefore, the first mold piece 231 and the second mold piece 232 can be removed separately from each other. Specifically, after the first mold piece 231 starts to be moved in the rearward direction Dfr in relation to the rear molded portion 10zr, the second mold piece 232 is moved in the rearward direction Dfr in relation to the rear molded portion 10zr. Thus, as compared with the case where the first mold piece 231 and the second mold piece 232 start to move in unison in relation to the rear molded portion 10zr, since the possible greatest area of contact between the rear molded portion 10zr and a mold piece to start to move can be reduced, there can be restrained application of force (e.g., frictional force) to the rear molded portion 10zr from the mold piece to start to move. As a result, deformation of the rear molded portion 10zr can be restrained in releasing the rear molded portion 10zr from the mold piece. For example, there can be restrained deterioration in density of a portion of the rear molded portion 10zr, which could otherwise result from a portion of the rear molded portion 10zr being pulled in the rearward direction Dfr.

Particularly, the first mold piece 231 forms a portion of the internal surfaces 18o and 11o of the rear mold piece 230 located on the rearward direction Dfr side with respect to a direction parallel to the axial line CL. The second mold piece 232 forms a portion of the internal surfaces 18o and 11o of the rear mold piece 230 on the forward direction Df side with respect to the direction parallel to the axial line CL. In this manner, the mold pieces 231 and 232 form different portions of the internal surfaces 18o and 11o of the rear mold piece 230 which differ in axial ranges in the direction parallel to the axial line CL. Thus, a procedure in which, after the first mold piece 231 starts to move, the second mold piece 232 starts to move can be readily implemented.

As described with reference to FIG. 1, the cover 430 for the plug cap 400 is attached to the rear trunk portion 18 of the insulator 10. In the section shown in FIG. 1, if the inclination of the outer circumferential surface of the rear trunk portion 18 from the axial line CL (such an inclination that the outside diameter reduces in the rearward direction Dfr) is large, adhesion between the cover 430 and the rear trunk portion 18 may deteriorate. Deterioration in adhesion between the cover 430 and the rear trunk portion 18 causes the formation of a gap between the cover 430 and the rear trunk portion 18, potentially resulting in generation of discharge from the metal terminal member 40 to the metallic shell 50 through the gap. In order to suppress such an unintended discharge, the inclination of the outer circumferential surface of the rear trunk portion 18 from the axial line CL is preferably small. In order to mold the rear trunk portion 18 having such a small inclination, the inclinations of the internal surfaces of the mold pieces 231 and 232 (FIG. 3) are preferably small.

A first inclination d1$a$/d1$b$ shown in step S200 of FIG. 3 indicates the inclination of the internal surface 18$o$1 of the first mold piece 231, and a second inclination d2$a$/d2$b$ indicates the inclination of the internal surface 18$o$2 of the second mold piece 232. The inclination d1$a$/d1$b$ (d2$a$/d2$b$) indicates the ratio of a positional change d1$a$ (d2$a$) in a direction perpendicular to the axial line CL to a positional change d1$b$ (d2$b$) in a direction parallel to the axial line CL. Inclinations d1$a$/d1$b$ and d2$a$/d2$b$ of zero indicate that the internal surfaces 18$o$1 and 18$o$2 are parallel to the axial line CL. Inclinations d1$a$/d1$b$ and d2$a$/d2$b$ greater than zero indicate that the internal surfaces 18$o$1 and 18$o$2 reduce in diameter in the rearward direction Dfr.

In order to enhance adhesion between the plug cap 400 (herein, the cover 430) and the insulator 10, these inclinations d1$a$/d1$b$ and d2$a$/d2$b$ are preferably small. For example, preferably, the first inclination d1$a$/d1$b$ is 5/1,000 or less. Similarly, preferably, the second inclination d2$a$/d2$b$ is 5/1,000 or less. Even in employment of such a profile feature, since, as mentioned above, the rear mold piece 230 is disassembled to the mold pieces 231 and 232 to thereby be removed from the molded body 10z, deformation of the rear molded portion 10zr can be restrained in releasing the rear molded portion 10zr from the rear mold piece 230.

Notably, an inclination of 5/1,000 or less may be implemented even at a portion of the internal surface 18$o$1. Similarly, an inclination of 5/1,000 or less may be implemented even at a portion of the internal surface 18$o$2. Also, at least one of the entire internal surface of the first mold piece 231 and the entire internal surface of the second mold piece 232 may have an inclination in excess of 5/1,000. In any of these cases, preferably, the rear mold piece 230 does not have a portion whose inside diameter increases in the rearward direction Dfr, and has only at least one of a portion whose inside diameter remains unchanged in the rearward direction Dfr, and a portion whose inside diameter reduces in the rearward direction Dfr. This profile feature allows the mold pieces 231 and 232 to be readily removed from the molded body 10z while deformation of the rear molded portion 10zr is restrained, by moving the mold pieces 231 and 232 of the rear mold piece 230 in the rearward direction Dfr.

In recent years, in order to improve the performance of an internal combustion engine, voltage applied to the spark plug 100 tends to increase. In the case of application of a high voltage, discharge is likely to occur along a path extending on an outer circumferential surface of the insulator 10 (particularly, the rear portion 10r) from the metal terminal member 40 to the metallic shell 50. In order to suppress such an unintended discharge, for example, the length of the rear portion 10r can be increased.

Figure 7:
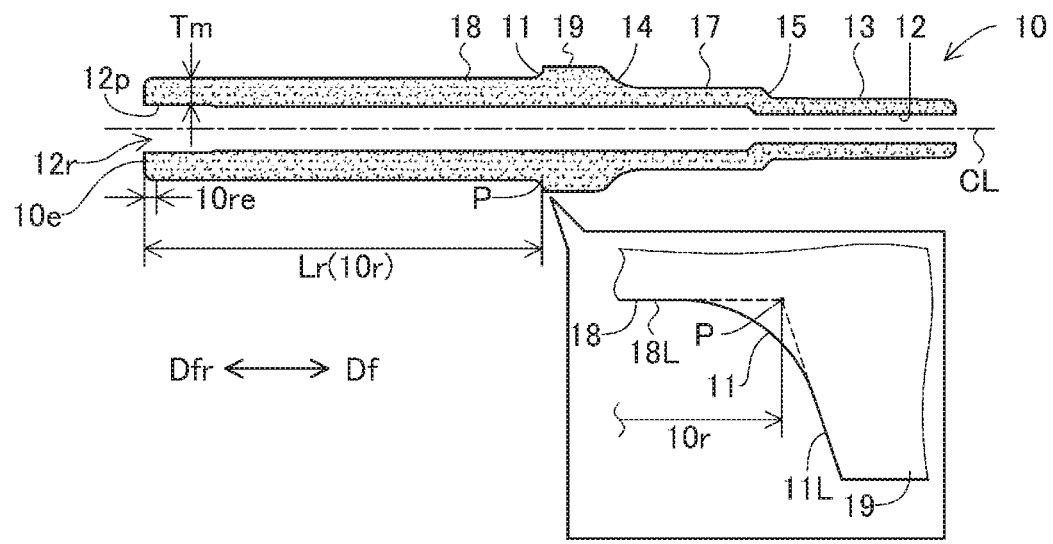
FIG. 7 is an explanatory view for explaining the length of a rear portion 10r.

FIG. 7 is an explanatory view for explaining the length of the rear portion 10r. The drawing shows a section of the insulator 10 taken by cutting with a plane which contains the axial line CL. A position P (called a "forward end position P") in the drawing indicates the position of an end of the rear portion 10r on the forward direction Df side. The drawing includes at the bottom an enlarged view showing the forward end position P and its periphery. The forward end position P is specified as follows. On the section which contains the axial line CL, the forward end position P is an intersection P between an extension line extending from a straight portion 18L of the surface of the rear trunk portion 18 which is located closest to the second outside-diameter-reducing portion 11, and an extension line extending from a straight portion 11L of the surface of the second outside-diameter-reducing portion 11 which is located most distant from the rear trunk portion 18. A length Lr (called a "rear portion length Lr") in the drawing is the length of the rear portion 10r in parallel to the axial line CL; i.e., the distance in parallel to the axial line CL between the forward end position P and an end 10e of the insulator 10 on the rearward direction Dfr side.

By increasing the rear portion length Lr, an intended discharge can be suppressed, since the distance between the metal terminal member 40 and the metallic shell 50 increases accordingly. For example, preferably, the rear portion length Lr is 30 mm or more. Even in the case of employment of such a length, as mentioned above, since the rear mold piece 230 is disassembled into the mold pieces 231 and 232 to thereby be removed from the molded body 10z, deformation of the rear molded portion 10zr can be restrained in releasing the rear molded portion 10zr from the rear mold piece 230. Notably, in the case of employment of a long rear portion length Lr, the spark plug 100 increases in size. In order to avoid an excessive increase in size of the spark plug 100, the employment of a short rear portion length Lr is preferred; for example, a rear portion length Lr of 60 mm or less is preferred. The rear portion length Lr may be less than 30 mm.

FIG. 7 also indicates a minimum wall thickness Tm of the rear portion 10r. In the present embodiment, the inside diameter of the axial hole 12 is such that a portion 12p including the opening 12r on the rearward direction Dfr side of the insulator 10 is slightly greater in inside diameter than the other portion of the axial hole 12. Accordingly, the minimum wall thickness Tm is a thickness at this portion 12p. An end portion on the rearward direction side Dfr of the insulator 10 may be chamfered. The minimum wall thickness Tm is specified at a portion of the rear portion 10r remaining after removing the chamfered portion. For example, the minimum wall thickness Tm is specified at a portion of the rear portion 10r remaining after removing a rear end portion 10re, which ranges from the end 10e on the rearward direction Dfr side over a distance of 3 mm or less in parallel to the axial line CL.

In order to reduce the size of the spark plug 100, the diameter of the insulator 10 is preferably small. In the case where the diameter of the insulator 10 is small, the minimum wall thickness Tm of the rear portion 10r also becomes small. The minimum wall thickness Tm may be 2.6 mm or less. In the case where the minimum wall thickness Tm is small, the rear molded portion 10zr is apt to deform in removing the rear mold piece 230 from the rear molded portion 10zr. However, as mentioned above, since the rear mold piece 230 is disassembled into the mold pieces 231 and 232 to thereby be removed from the molded body 10z, deformation of the rear molded portion 10zr can be restrained in releasing the rear molded portion 10zr from the rear mold piece 230. In order to restrain deformation of the rear molded portion 10zr, the minimum wall thickness Tm is preferably large; for example, a minimum wall thickness Tm of 1.5 mm or more is preferred. The minimum wall thickness Tm may be in excess of 2.6 mm.

An employed dimensional profile may be such that the minimum wall thickness Tm is 2.6 mm or less, and the rear portion length Lr is 30 mm or more. In this case, both a reduction in size of the spark plug 100 and restraint of unintended discharge can be readily implemented. In this case also, since the rear mold piece 230 is disassembled into the mold pieces 231 and 232 to thereby be removed from the molded body 10z, deformation of the rear molded portion 10zr can be restrained in releasing the rear molded portion 10zr from the rear mold piece 230.

B. Second Embodiment

Figure 8:
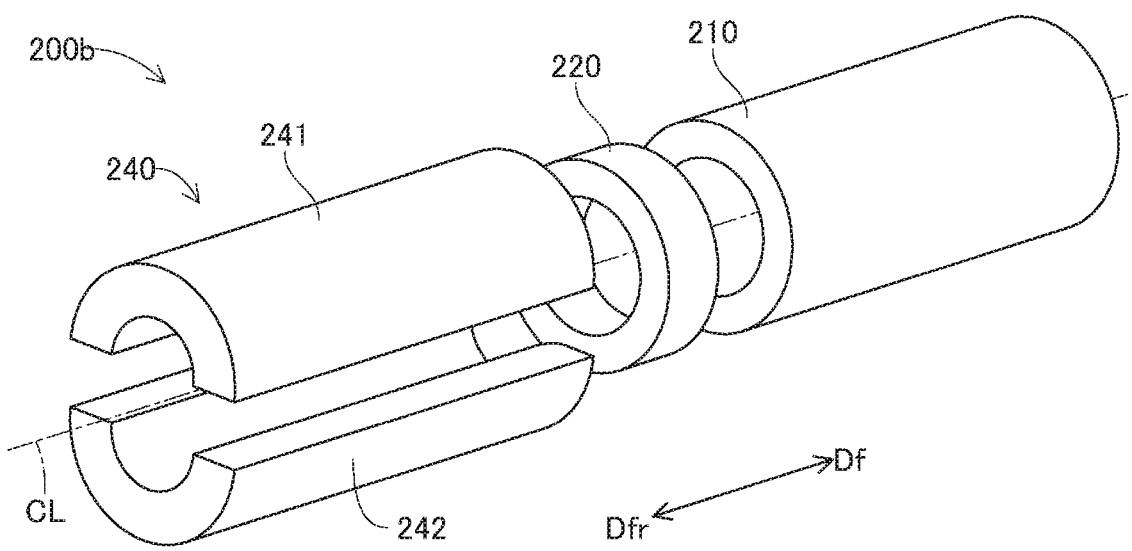
FIG. 8 is an exploded perspective view of another embodiment of the external mold.

FIG. 8 is an exploded perspective view of another embodiment of the external mold. Difference from the external mold 200 of FIGS. 3 and 6 is that the rear mold 230 is replaced with a rear mold 240 (called the "rear mold piece 240"). An external mold 200b of the second embodiment has the forward mold piece 210, the intermediate mold piece 220, and the rear mold piece 240. The forward mold piece 210 and the intermediate mold piece 220 are similar to the forward mold piece 210 and the intermediate mold piece 220, respectively, of FIGS. 3 and 6. The internal surface of the rear mold piece 240 has a shape identical to that of the internal surface of the rear mold piece 230 of the first embodiment. The rear mold piece 240 is composed of a first mold piece 241 and a second mold piece 242. The mold pieces 241 and 242 are obtained by bisecting the rear mold piece 240 with a plane which contains the axial line CL.

Figure 9:
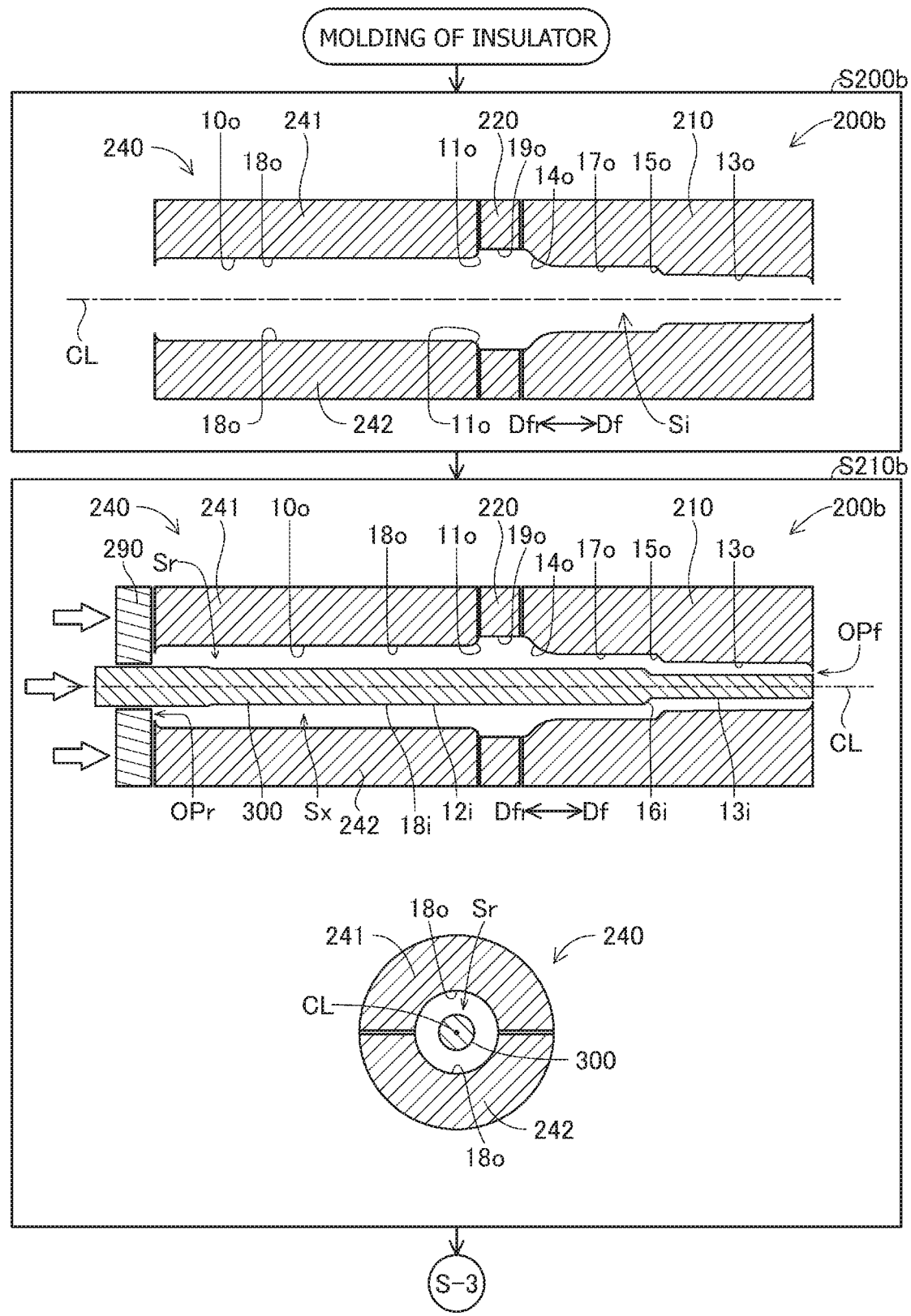
FIG. 9 is a flowchart showing an example procedure for molding a molded body 10z in the second embodiment.
Figure 10:
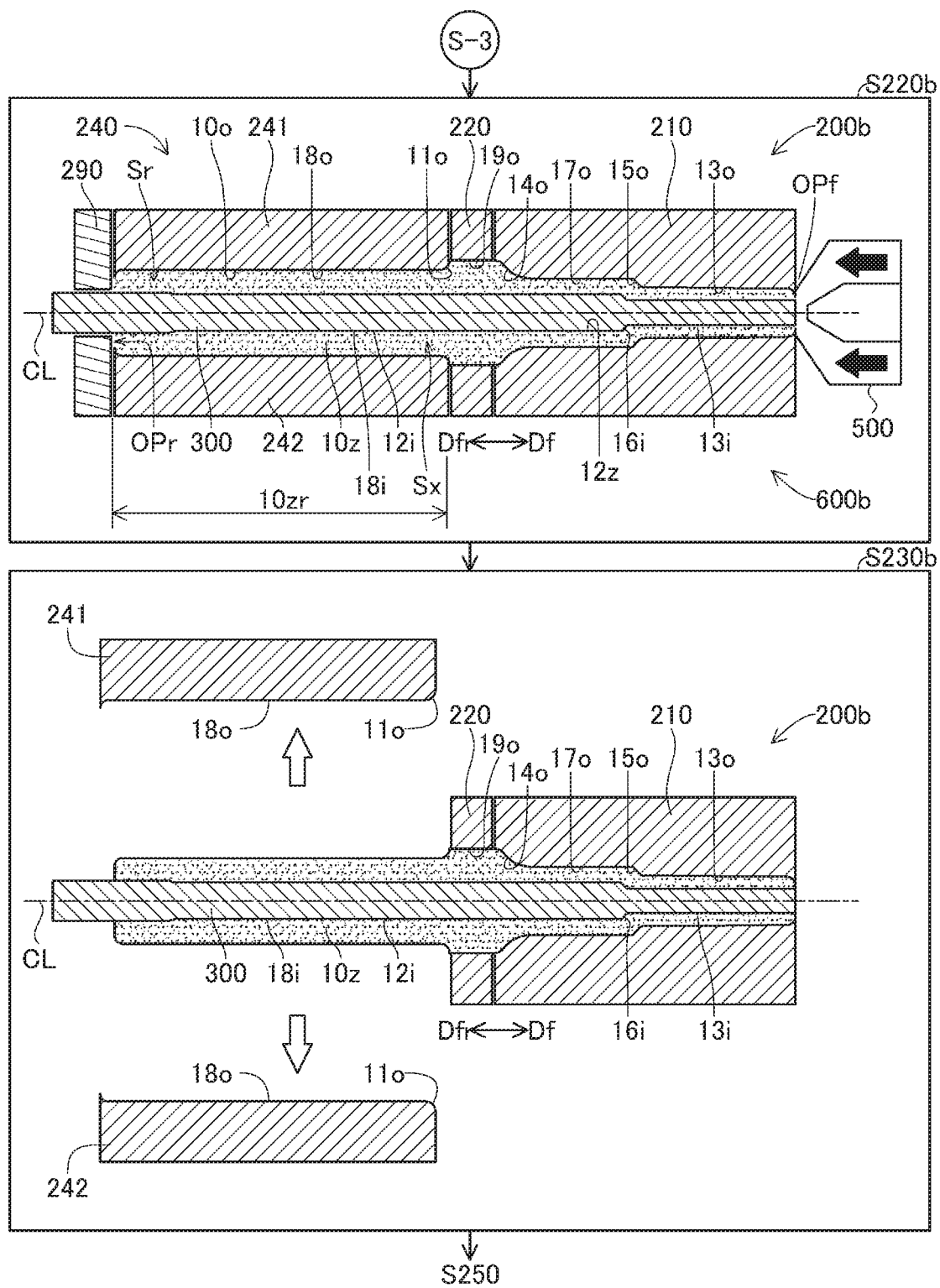
FIG. 10 is a flowchart showing an example procedure for molding the molded body 10z in the second embodiment.

FIGS. 9 and 10 are flowcharts showing an example procedure of a step (S103 in FIG. 2) for molding the molded body 10z in the second embodiment. FIG. 10 is continued from FIG. 9. Similar to FIGS. 3 to 5, in the drawings, frames indicative of steps confine schematic sections of molds used in the steps.

In step S200b, the mold pieces 210, 220, 241, and 242 are assembled to form the external mold 200b. The internal surface 10o of the assembled external mold 200b has a shape identical to that of the internal surface of the external mold 200 of the first embodiment.

In the next step S210b, the rod member 300 is disposed in the space Si surrounded by the internal surface 10o. Further, the rear end mold 290 for closing the second opening OPr is disposed on the rearward direction Dfr side of the external mold 200b. These operations are similar to those in step S210 (FIG. 3) of the first embodiment. The frame indicative of step S210b of FIG. 9 shows, at the bottom, a section taken perpendicularly to the axial line CL. The section is taken across the rear mold piece 240 and the rod member 300. As illustrated, the first mold piece 241 forms a portion of the internal surface of the rear mold piece 240 along a circumferential half (herein, an upper half) of the internal surface, and the second mold piece 242 forms a portion of the internal surface of the rear mold piece 240 along the remaining circumferential half (herein, a lower halt) of the internal surface.

In the next step S220b (FIG. 10), a nozzle 500 of an injection apparatus is connected to the first opening OPf, and a material is injected into the space Sx. As a result of this injection, the molded body 10z is molded. A mold 600b for molding the molded body 10z (i.e., the insulator 10) has the external mold 200b, the rod member 300, and the rear end mold 290.

In the next step S230b, the rear end mold 290 and the rear mold piece 240 are removed from the molded body 10z. The rear end mold 290 is moved in the rearward direction Dfr in relation to the molded body 10z to thereby be removed from the molded body 10z. The first mold piece 241 and the second mold piece 242 are moved away from the molded body 10z perpendicularly or obliquely in relation to the axial line CL to thereby be removed from the molded body 10z. In the example of FIG. 10, the first mold piece 241 is moved upward, and the second mold piece 242 is moved downward.

Processing subsequent to step S230b is similar to that subsequent to step S250 of FIG. 4. Now, the molded body 10z has been molded.

In this manner, in the present embodiment, the first mold piece 241 forms a portion of the internal surfaces 18o and 11o of the rear mold piece 240 along a circumferential half around the axial line CL. The second mold piece 242 forms a portion of the internal surfaces 18o and 11o of the rear mold piece 240 along the remaining circumferential half around the axial line CL. In this manner, the mold pieces 241 and 242 form respective portions of the internal surfaces 18o and 11o of the rear mold piece 240 which differ in circumferential range. Therefore, the mold pieces 241 and 242 which constitute the rear mold piece 240 can be removed from the molded body 10z by moving the mold pieces 241 and 242 away from the molded body 10z perpendicularly or obliquely in relation to the axial line CL. In this manner, the mold pieces can be removed from the molded body 10z without need to move the mold pieces along the outer surface of the rear molded portion 10zr while the internal surfaces of the mold pieces are in contact with the outer surface of the rear molded portion 10zr. Therefore, there can be restrained application of force from a moving mold piece to the rear molded portion 10zr. As a result, deformation of the rear molded portion 10zr can be restrained in releasing the rear molded portion 10zr from the mold piece.

C. Other Embodiments of External Mold

Figure 11A:
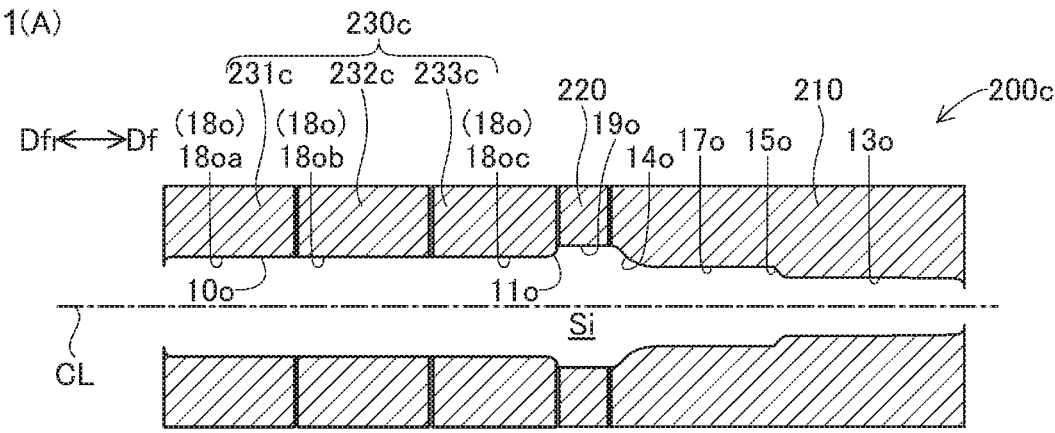
FIGS. 11(A)-11(E) are a set of sectional views showing other embodiments of the external mold.
Figure 11B:
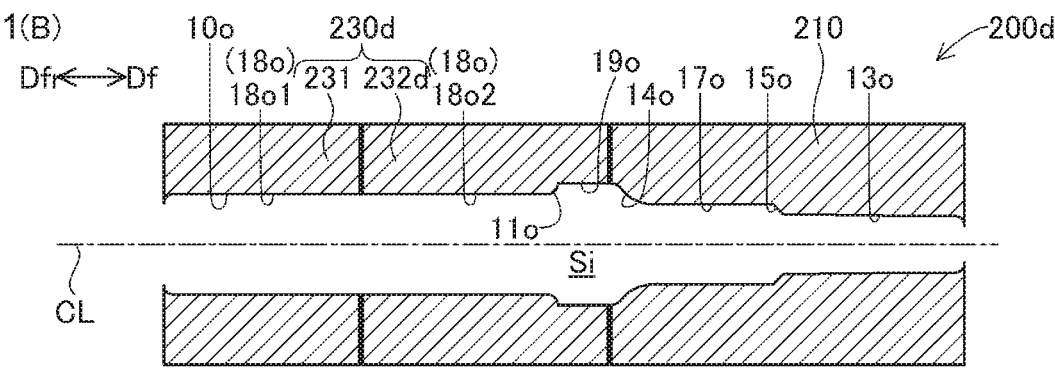
Figure 11C:
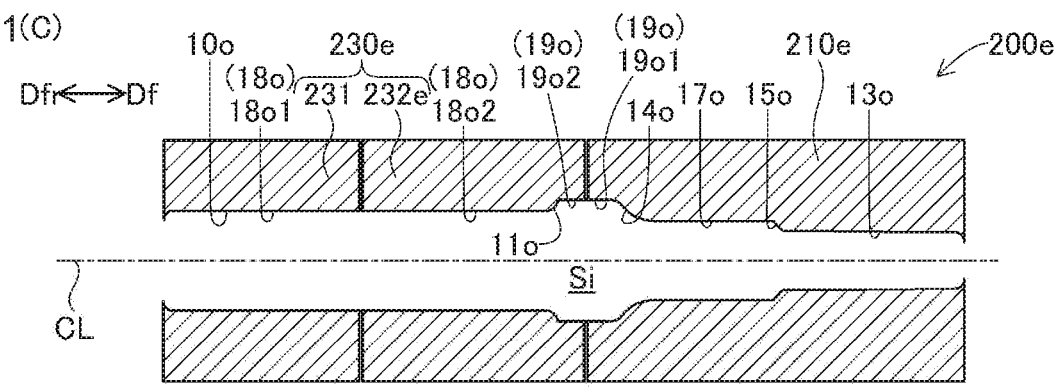
Figure 11D:
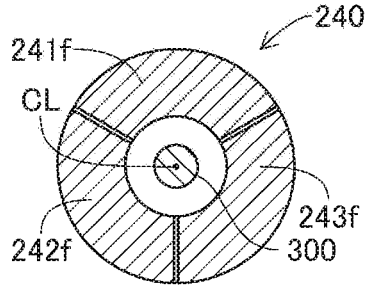
Figure 11E:
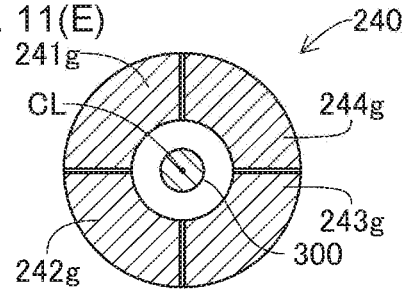

FIGS. 11(A)-11(E) are a set of sectional views showing other embodiments of the external mold. FIGS. 11(A) to 11(C) are sectional views taken by cutting with a plane which contains the axial line CL, and FIGS. 11(D) and 11(E) are sectional views taken perpendicularly to the axial line CL.

An external mold 200c of FIG. 11(A) is the external mold 200 of FIG. 3 in which the rear mold piece 230 is replaced with a rear mold piece 230c. The external mold 200c forms the internal surface 10o identical to the internal surface 10o of the external mold 200. The rear mold piece 230c is composed of three mold pieces 231c, 232c, and 233c. The rear mold piece 230c forms the internal surfaces 18o and 11o identical to the internal surfaces 18o and 11o of the rear mold piece 230 of FIG. 3. The three mold pieces 231c, 232c, and 233c are disposed in this order in the forward direction Df. The first mold piece 231c forms a portion of the internal surface of the rear mold piece 230c along the entire circumference of the internal surface; the second mold piece 232c forms a portion of the internal surface of the rear mold piece 230c along the entire circumference of the internal surface located on the forward direction Df side of the first mold piece 231c; and the third mold piece 233c forms a portion of the internal surface of the rear mold piece 230c along the entire circumference of the internal surface located on the forward direction Df side of the second mold piece 232c.

After a molded body is formed by molding, the rear mold piece 230c is disassembled into the three mold pieces 231c, 232c, and 233c, whereby the molded body is released from the rear mold piece 230c. Specifically, the first mold piece 231c is moved in the rearward direction Dfr; subsequently, the second mold piece 232c is moved in the rearward direction Dfr; subsequently, the third mold piece 233c is moved in the rearward direction Dfr. Since the greatest possible area of contact between the rear molded portion 10zr (FIG. 3) and a mold piece to start to move can be reduced, there can be restrained application of force (e.g., frictional force) to the rear molded portion 10zr from the mold piece to start to move. As a result, deformation of the rear molded portion 10zr can be restrained in releasing the rear molded portion 10zr from the mold piece.

An external mold 200d of FIG. 11(B) is similar to the external mold 200 of FIG. 3 except that the intermediate mold piece 220 and the rear mold piece 230 are collectively replaced with a rear mold piece 230d. The external mold 200d forms the same internal surface 10o as that of the external mold 200. The rear mold piece 230d is composed of two mold pieces 231 and 232d. The first mold piece 231 is identical to the first mold piece 231 of FIG. 3. The shape of the second mold piece 232d is the collective shape of the second mold piece 232 and the intermediate mold piece 220 of FIG. 3.

The second mold piece 232d does not have a portion whose inside diameter increases in the rearward direction Dfr. Therefore, after the molded body is molded, by moving the first mold piece 231 in the rearward direction Dfr and then moving the second mold piece 232d in the rearward direction Dfr, the rear mold piece 230d can be removed from the molded body. As a result, deformation of the rear molded portion 10zr (FIG. 3) can be restrained in releasing the rear molded portion 10zr from the mold piece.

An external mold 200e of FIG. 11(C) has a forward mold piece 210e and a rear mold piece 230e. The rear mold piece 230e is composed of the first mold piece 231 and a second mold piece 232e. The first mold piece 231 is identical to the first mold piece 231 of FIG. 3. The shape of the second mold piece 232e is the collective shape of the second mold piece 232 and a portion on the rearward direction Dfr side of the intermediate mold piece 220 of FIG. 3. The shape of the forward mold piece 210e is identical to the collective shape of the forward mold piece 210 and the remaining portion (a portion on the forward direction Dfr side) of the intermediate mold piece 220 of FIG. 3. The external mold 200e forms the same internal surface 10o as that of the external mold 200 of FIG. 3.

The second mold piece 232e does not have a portion whose inside diameter increases in the rearward direction Dfr. Therefore, after the molded body is molded, by moving the first mold piece 231 in the rearward direction Dfr and then moving the second mold piece 232e in the rearward direction Dfr, the rear mold piece 230e can be removed from the molded body. As a result, deformation of the rear molded portion 10zr (FIG. 3) can be restrained in releasing the rear molded portion 10zr from the mold piece.

Also, the forward mold piece 210e does not have a portion whose inside diameter increases in the forward direction Df. Therefore, after the molded body is molded, by moving the forward mold piece 210e in the forward direction Df, the forward mold piece 210e can be readily removed from the molded body 10z.

A rear mold piece 240f of FIG. 11(D) can be used in place of the rear mold piece 240 of FIGS. 8 and 9. The rear mold piece 240f forms the same internal surfaces (not shown) as the internal surfaces 18o and 11o of the rear mold piece 240 of FIG. 9. The rear mold piece 240f differs from the rear mold piece 240 of FIGS. 8 and 9 only in that the rear mold piece 240f is composed of three circumferentially disposed mold pieces 241f, 242f, and 243f. Each of the three mold pieces 241f, 242f, and 243f forms a portion of the internal surface of the rear mold piece 240f along one-third of the circumference.

A rear mold piece 240g of FIG. 11(E) can be used in place of the rear mold piece 240 of FIGS. 8 and 9. The rear mold piece 240g forms the same internal surfaces (not shown) as the internal surfaces 18o and 11o of the rear mold piece 240 of FIG. 9. The rear mold piece 240g differs from the rear mold piece 240 of FIGS. 8 and 9 only in that the rear mold piece 240g is composed of four circumferentially disposed mold pieces 241g, 242g, 243g, and 244g. Each of the four mold pieces 241g, 242g, 243g, and 244g forms a portion of the internal surface of the rear mold piece 240g along one-fourth of the circumference.

In removing the rear mold pieces 240f and 240g of FIGS. 11(D) and 11(E), respectively, the mold pieces which constitute the rear mold pieces 240f and 240g may be moved away from the molded body perpendicularly or obliquely in relation to the axial line CL. By this procedure, the mold pieces can be removed from the molded body 10z without need to move the mold pieces along the outer surface of the rear molded portion 10zr while the internal surfaces of the mold pieces are in contact with the outer surface of the rear molded portion 10zr (FIG. 3). Therefore, there can be restrained application of force from a moving mold piece to the rear molded portion 10zr. As a result, deformation of the rear molded portion 10zr can be restrained in releasing the rear molded portion 10zr from the mold piece.

D. Modifications (1) In the case where the rear mold for molding the rear portion 10r has a plurality of mold pieces which differ in axial range in the direction of the axial line CL as in the case of the embodiments of FIG. 3 and FIGS. 11(A) to 11(C), the number of the axial ranges is not limited to 2 (FIG. 3) or 3 (FIG. 11(A)), but may be 4 or more. In any of these cases, various methods in which a plurality of mold pieces are moved in the rearward direction Dfr sequentially from the mold piece on the rearward direction Dfr side can be employed for removing the mold pieces from a molded body. Preferably, after the mold piece which has started to move moves entirely rearward Dfr of the end 10ze (FIG. 4) of the molded body 10z on the rearward direction Dfr side, the next mold piece starts to move. By virtue of this procedure, as compared with the case where a plurality of mold pieces on the molded body 10z are moved parallelly, the process of moving the mold pieces can be simplified, whereby application of force from a moving mold piece to the rear molded portion 10zr can be restrained. However, before the mold piece which has started to move moves entirely rearward Dfr of the end of the molded body 10z on the rearward direction Dfr side, the next mold piece may start to move.

(2) In the case where the rear mold for molding the rear portion 10r has a plurality of mold pieces which differ in circumferential range as in the case of the embodiments of FIG. 9 and FIGS. 11(D) and 11(E), the number of circumferential ranges is not limited to 2 (FIG. 9), 3 (FIG. 11(D)), or 4 (FIG. 11(E)), but may be 5 or more. In the case where the mold pieces differ in circumferential range, the mold pieces can be removed from the molded body 10z by moving the mold pieces perpendicularly or obliquely in relation to the axial line CL rather than moving the mold pieces in parallel to the axial line CL. Therefore, the rear portion 10r of the insulator 10 may have a portion whose outside diameter increases in the rearward direction Dfr.

Also, a circumferential range covered by a single mold piece may differ among the mold pieces. In any of these cases, preferably, a circumferential range covered by a single mold piece is semicircumference or less (i.e., the central angle is 180 degrees or less). Employment of this profile feature can restrain the mold pieces from pulling the molded body 10z in moving the mold pieces perpendicularly or obliquely in relation to the axial line CL.

(3) In the case where the rear mold for molding the rear portion 10r has a plurality of mold pieces which differ in axial range along the axial line CL as in the case of the embodiments of FIG. 3 and FIGS. 11(A) to 11(C), a mold piece for molding over at least a partial axial range along the axial line CL may further have a plurality of mold pieces which differ in circumferential range. For example, the second mold piece 232 of FIG. 3 may be divided into a plurality of mold pieces which differ in circumferential range. Employment of such a mold structure can further restrain application of force from a moving mold piece to the rear molded portion 10zr.

(4) A mold piece (e.g., the forward mold piece 210 (FIG. 3) or 210e (FIG. 11(C)) for molding a portion located forward Df of the large-diameter portion 19 may be divided into a plurality of mold pieces. In this case also, preferably, a single mold piece is used to mold the outer circumferential surface of a portion of the insulator 10 to be exposed to combustion gas; i.e., a portion on the forward direction Df side from the first outside-diameter-reducing portion 15 in contact with the forward packing 8 (a portion including the first outside-diameter-reducing portion 15). Since employment of such a single mold piece can restrain the formation of fine protrusions, such as a parting line, on the outer circumferential surface of the portion on the forward direction Df side from the first outside-diameter-reducing portion 15, concentration of stress on protrusions can be restrained, or local temperature increase of protrusions can be restrained, which could otherwise result from the formation of protrusions. Therefore, a portion of the insulator 10 to be exposed to combustion gas (i.e., a portion whose temperature is apt to increase) can be improved in heat resistance.

(5) Regarding the order of removing a plurality of mold pieces of the external mold from the molded body 10z, in place of the orders of the above embodiments, various other orders can be employed. For example, after the forward mold pieces 210 and 210e are removed, the rear mold pieces 230, 230c, 230d, 230e, 240, 240f, and 240g may be removed. Also, after the rod member 300 is removed, the external mold may be removed. In any of these cases, in order to restrain deformation of the molded body 10z in releasing the molded body 10z from the mold pieces, preferably, the total number of mold pieces which simultaneously start to move in relation to the molded body 10z is one.

(6) Regarding a method for injecting a material into the space Sx for molding, in place of a method for injecting a material into the space Sx from the nozzle 500 connected to the first opening OPf, any other method can be employed. For example, a material may be injected into the space Sx from a nozzle connected to the second opening OPr with the first opening OPf closed with another mold piece. Also, a material may be injected into the space Sx from a gate provided at a mold piece (e.g., the intermediate mold piece 220 of FIG. 3) of the external mold and communicating with the space Sx.

(7) Regarding the structure of the mold, in place of the structures of the above embodiments, various other structures can be employed. For example, the rear end mold 290 (FIG. 3) may be a portion of the external mold (e.g., the first mold piece 231). Also, the rear end mold 290 may be a portion of the rod member 300. In the case of using a mold piece (called a "forward end mold") for closing the first opening OPf, the forward end mold may he a portion of the external mold (e.g., the forward mold piece 210). Also, the forward end mold may be a portion of the rod member 300.

In place of the rod member 300 in the form of a single continuous member, the rod member 300 may be formed by connecting a plurality of mold pieces. For example, the rod member 300 may be composed of a mold piece having the third external surface 13i, and a mold piece having the external surface extending in the rearward direction Dfr from the second external surface 16i inclusive. In removing the rod member 300 composed of a plurality of mold pieces from the molded body 10z, preferably, after a certain mold piece starts to move in relation to the molded body 10z, another mold piece starts to move in relation to the molded body 10z.

(8) Regarding the structure of the spark plug, in place of the above-mentioned structure, various other structures can be employed. For example, at least one of the first tip 29 of the center electrode 20 and the second tip 39 of the ground electrode 30 may be eliminated. A forward portion of the insulator 10 may be entirely disposed within the through hole 59 of the metallic shell 50. Regarding the shape of the center electrode 20, various shapes different from the shape described with reference to FIG. 1 may be employed. Regarding the shape of the ground electrode 30, various shapes different from the shape described with reference to FIG. 1 may be employed. The insulator 10 is described as a substantially cylindrical member having the through hole 12 extending therethrough along the center axis CL; however, the insulator 10 is not limited thereto, but may be a closed-bottomed tubular member having a closed forward end.

The present invention has been described with reference to the above embodiments and modifications. However, the embodiments and modifications are meant to help understand the invention, but are not meant to limit the invention. The present invention may be modified or improved without departing from the gist and the scope of the invention and encompasses equivalents of such modifications and improvements.

DESCRIPTION OF REFERENCE NUMERALS

5 . . . gasket
6 . . . first rear packing
7 . . . second rear packing
8 . . . forward packing
9 . . . talc
10 . . . insulator (ceramic insulator)
10o . . . internal surface (molding surface)
10r . . . rear portion,
10e, 10ze . . . end
10z . . . molded body
10re . . . rear end portion
10zr . . . rear molded portion
11 . . . second outside-diameter-reducing portion
11L . . . straight portion
11o . . . internal surface
12 . . . through hole (axial hole)
12i . . . external surface (molding surface)
12p . . . portion
12r . . . opening
12z . . . axial hole
13 . . . leg portion
13i . . . third external surface
13o . . . internal surface
14 . . . third outside-diameter-reducing portion
14o . . . internal surface
15 . . . first outside-diameter-reducing portion
15o . . . internal surface
16 . . . first inside-diameter-reducing portion
16i . . . second external surface
17 . . . forward trunk portion
17o . . . internal surface
18 . . . rear trunk portion
18L . . . straight portion
18i . . . first external surface1
18o . . . internal surface
18o1 . . . internal surface
18o2 . . . internal surface
19 . . . large-diameter portion (collar portion)
19o . . . internal surface
20 . . . center electrode
21 . . . outer layer
22 . . . core
23 . . . head portion
24 . . . collar portion
25 . . . leg portion
27 . . . shaft member
29 . . . first tip
30 . . . ground electrode
31 . . . distal end portion
35 . . . outer layer
36 . . . core
37 . . . shaft member
39 . . . second tip
40 . . . metal terminal member
50 . . . metallic shell
51 . . . tool engagement portion
52 . . . thread
53 . . . crimp portion
54 . . . seat portion
55 . . . trunk portion
56 . . . inside-diameter-reducing portion
57 . . . forward end surface
58 . . . deformed portion
59 . . . through hole
60 . . . first seal member
70 . . . resistor
80 . . . second seal member
100 . . . spark plug,
200, 200b, 200c, 200d, 200e . . . external mold
210, 210e . . . forward mold (forward mold piece)
220 . . . intermediate mold (intermediate mold piece)

230, 230c, 230d, 230e . . . rear mold (rear mold piece)
231, 231c . . . first mold piece
232, 232c, 232d, 232e . . . second mold piece
233c . . . third mold piece
240, 240f, 240g . . . rear mold (rear mold piece)
241, 242, 241f to 243f, 241g to 244g . . . mold piece
290 . . . rear end mold
300 . . . rod member
400 . . . plug cap
410 . . . cap body
412 . . . cavity
420 . . . terminal connection member
430 . . . cover
500 . . . nozzle
600, 600b . . . mold
g . . . gap
P . . . forward end position
CL . . . center axis (axial line)
Df . . . forward-end direction (forward direction)
Si, Sr, Sx . . . space
Tm . . . minimum wall thickness
Sp . . . space
Lr . . . rear portion length
OPf . . . first opening
OPr . . . second opening
Dfr . . . rear-end direction (rearward direction)

Having described the invention, the following is claimed:

1. A spark plug insulator production method for manufacturing a tubular insulator for a spark plug having a large-diameter portion having the largest outside diameter, a portion smaller in outside diameter than the large-diameter portion, and an axial hole extending in a direction of an axial line, the method comprising:

disposing a rod member in a space of a rear mold, the rear mold having an internal surface whose shape is identical to an external shape of a rear molded portion located rearward, in the direction of the axial line, of a molded portion corresponding to the large-diameter portion of the insulator, wherein the internal surface defines the space of the rear mold, the rear mold comprising a plurality of mold pieces which form different portions of the internal surface, the rod member having an external surface identical in shape to a portion of the axial hole of the insulator corresponding to the rear molded portion;

injecting a material into a space formed between the internal surface of the rear mold and the external surface of the rod member, thereby molding the rear molded portion; and releasing the rear molded portion from the rear mold by disassembling the rear mold into the plurality of mold pieces, wherein the plurality of mold pieces include a first mold piece which forms a first partial internal surface of the internal surface of the rear mold along the entire circumference of the internal surface, and a second mold piece which is located forward, in the direction of the axial line, of the first mold piece and forms a second partial internal surface of the internal surface of the rear mold along the entire circumference of the internal surface, and the step of releasing the rear molded portion from the rear mold includes starting to move the first mold piece rearward in the direction of the axial line in relation to the rear molded portion, and, subsequently starting to move the first mold piece, starting to move the second mold piece rearward in relation to the rear molded portion, thereby disassembling the rear mold into the plurality of mold pieces.

2. The spark plug insulator production method according to claim 1, wherein each of the first partial internal surface and the second partial internal surface of the rear mold includes a portion whose inclination from the direction of the axial line is 5/1,000 or less.

3. A mold for molding a tubular insulator for a spark plug having a large-diameter portion having the largest outside diameter, a portion smaller in outside diameter than the large-diameter portion, and an axial hole extending in a direction of an axial line, the mold comprising:

a rear mold having an internal surface whose shape is identical to an external shape of a rear molded portion located rearward, in the direction of the axial line, of a molded portion corresponding to the large-diameter portion of the insulator, and having a space defined by the internal surface; and a rod member having an external surface identical in shape to a portion of the axial hole of the insulator corresponding to the rear molded portion, and being disposed in the space of the rear mold, wherein the rear mold comprises a plurality of mold pieces which form different portions of the internal surface of the rear mold.

4. The mold according to claim 3, wherein the plurality of mold pieces form different portions of the internal surface of the rear mold which differ in circumferential range.

5. The mold according to claim 3, wherein the plurality of mold pieces form different portions of the internal surface of the rear mold which differ in axial range along the direction of the axial line.

* * * * *